United States Patent [19]

Herbst et al.

[11] Patent Number: 5,812,604
[45] Date of Patent: Sep. 22, 1998

[54] CONSTANT ENVELOPE CONTINUOUS PHASE FREQUENCY SHIFT KEY MODULATION APPARATUS AND METHOD AT RADIO FREQUENCIES

[75] Inventors: Charles A. Herbst, Palm Bay; Larry John Fruit, Melbourne; James Allan Wilkerson, Jr., Palm Harbor, all of Fla.

[73] Assignee: Scientific-Atlanta, Inc., Norcross, Ga.

[21] Appl. No.: 680,821

[22] Filed: Jul. 16, 1996

[51] Int. Cl.[6] .................................................. H04L 27/20
[52] U.S. Cl. ......................................... 375/308; 332/103
[58] Field of Search ................................... 375/296, 276, 375/295, 280, 281, 308, 290, 291, 303; 332/103; 370/316; 455/12.1, 44

[56] References Cited

U.S. PATENT DOCUMENTS

| | | | |
|---|---|---|---|
| 4,281,412 | 7/1981 | Wissel et al. | 375/332 |
| 4,338,491 | 7/1982 | Parker et al. . | |
| 4,339,724 | 7/1982 | Feher | 327/129 |
| 4,350,879 | 9/1982 | Feher | 377/28 |
| 4,426,710 | 1/1984 | Pommier | 375/290 |
| 4,567,602 | 1/1986 | Kato et al. | 375/296 |
| 4,613,976 | 9/1986 | Sewerinson et al. | 375/279 |
| 4,644,565 | 2/1987 | Seo et al. | 375/296 |
| 4,688,005 | 8/1987 | Kipnis | 331/117 R |
| 4,691,380 | 9/1987 | Westgate | 455/328 |
| 4,720,839 | 1/1988 | Feher et al. | 375/291 |
| 4,730,344 | 3/1988 | Saha | 375/280 |
| 4,733,199 | 3/1988 | Khanna | 331/99 |
| 4,737,737 | 4/1988 | Khanna | 331/47 |
| 4,739,289 | 4/1988 | Cripps | 333/26 |
| 4,749,959 | 6/1988 | Cripps et al. | 330/277 |
| 4,817,116 | 3/1989 | Akaiwa et al. | 375/276 |
| 4,843,615 | 6/1989 | Davis | 375/278 |
| 4,851,787 | 7/1989 | Martin | 333/1 A |
| 4,881,050 | 11/1989 | Swanson, Jr. | 333/185 |
| 4,928,078 | 5/1990 | Khandavalli | 333/109 |
| 4,940,949 | 7/1990 | Landi | 330/262 |
| 4,945,312 | 7/1990 | Auger et al. | 329/345 |
| 4,949,357 | 8/1990 | Sehier | 375/332 |
| 4,954,790 | 9/1990 | Barber | 332/164 |
| 4,975,065 | 12/1990 | Rosenberg et al. | 439/63 |
| 4,988,959 | 1/1991 | Khanna et al. | 331/117 D |
| 5,020,080 | 5/1991 | Tanguy et al. | 375/324 |
| 5,045,731 | 9/1991 | Riddle | 327/238 |
| 5,111,455 | 5/1992 | Negus | 370/518 |
| 5,126,827 | 6/1992 | Frank | 257/704 |
| 5,127,984 | 7/1992 | Hua et al. . | |
| 5,148,127 | 9/1992 | Cheon . | |
| 5,215,866 | 6/1993 | Maple | 430/314 |
| 5,454,009 | 9/1995 | Fruit et al. | 375/202 |
| 5,467,373 | 11/1995 | Ketterling | 375/327 |
| 5,491,457 | 2/1996 | Feher | 332/103 |
| 5,509,033 | 4/1996 | Chen | 332/103 |
| 5,579,342 | 11/1996 | Crozier | 375/296 |

Primary Examiner—Tesfadet Bocure
Attorney, Agent, or Firm—Hubert J. Barnhardt, III; Kenneth M. Massaroni; Kelly A. Gardner

[57] ABSTRACT

Constant envelope angle modulation apparatus comprises a frequency synthesizer for outputting a stepped output waveform having a selectable precise output frequency. The output of the synthesizer provides an input to a mixer for O-QPSK modulating a received information signal. The O-QPSK modulated signal is then hard-limited, for example, via a series of hard limiting amplifier and filter circuits and a divider circuit. Preferably, a data stream for modulation may be filtered via a filter having an approximately 70–100% roll-off characteristic, such as a root raised cosine filter. A hard-limited, constant envelope angle modulated signal results that is easily frequency converted to, for example, microwave frequencies for landline or satellite applications via a simple multiplier circuit. The multiplier circuit preferably comprises a series of stage-filtered multipliers and band pass filters to achieve the desired output microwave frequency.

28 Claims, 12 Drawing Sheets

A=OQPSK-HARD UNITED
B=OQPSK
BOTH WITH DIFFERENTIAL CODING

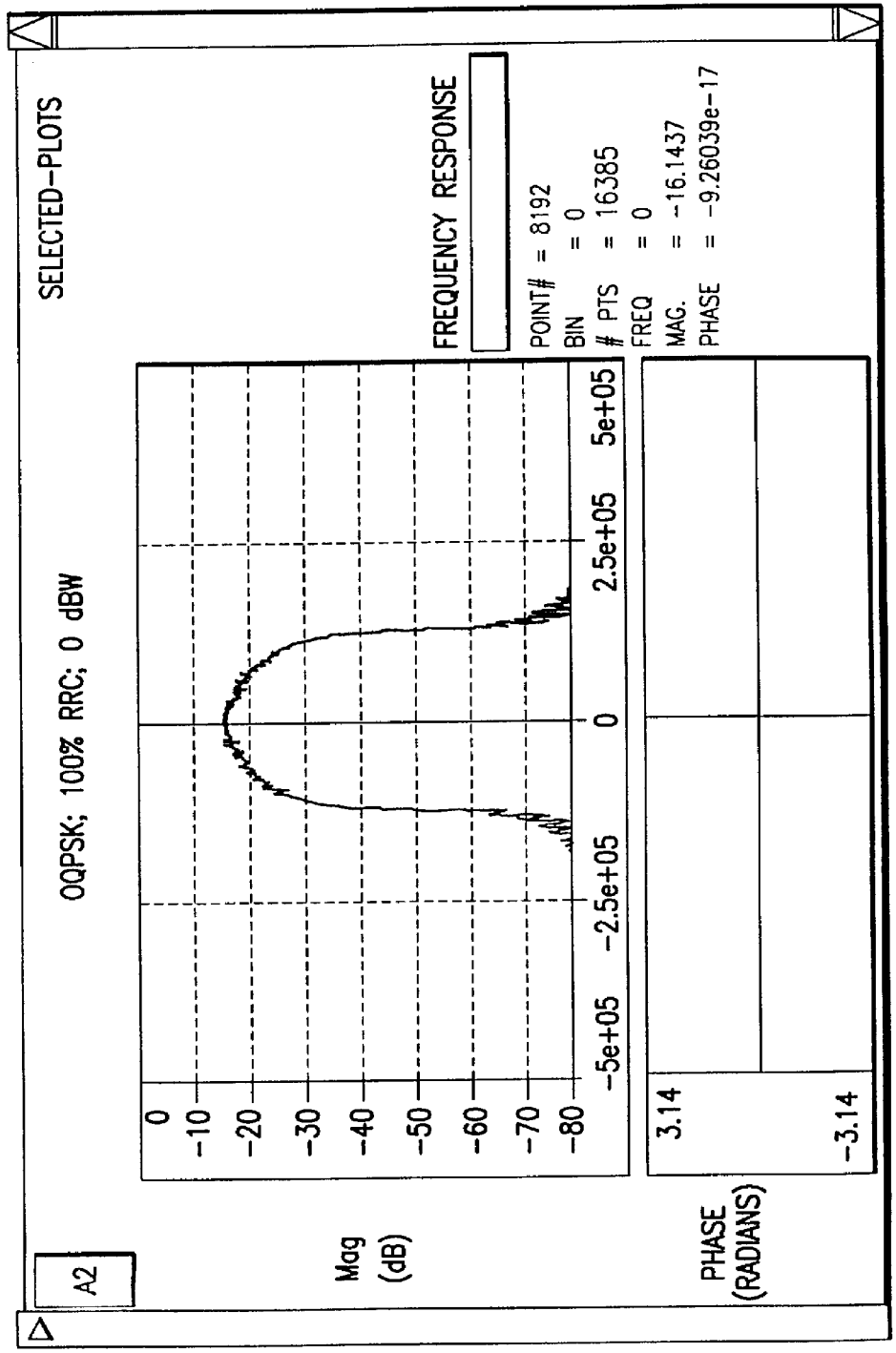
FIG.1B(1)

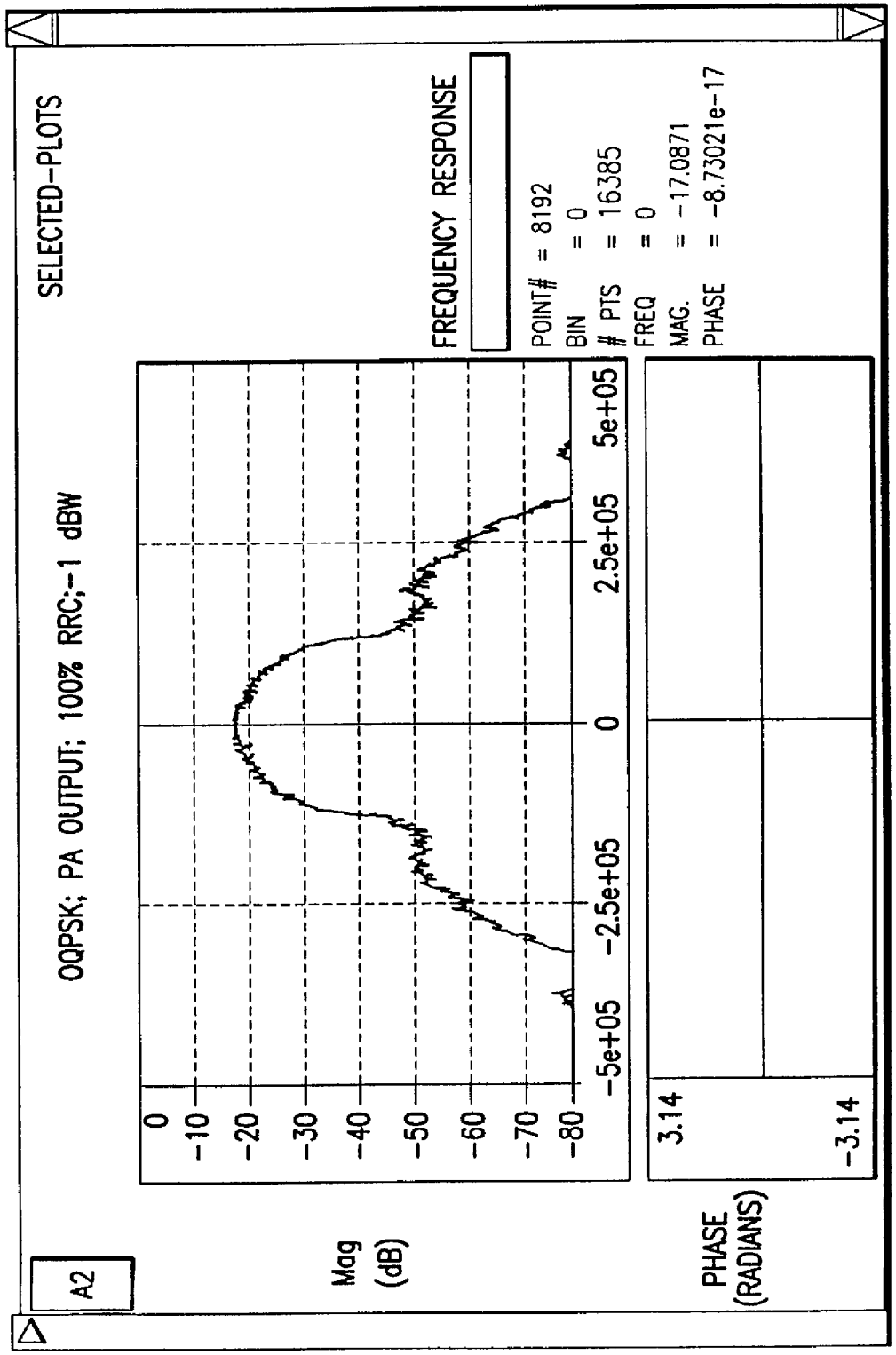
FIG.1B(2)

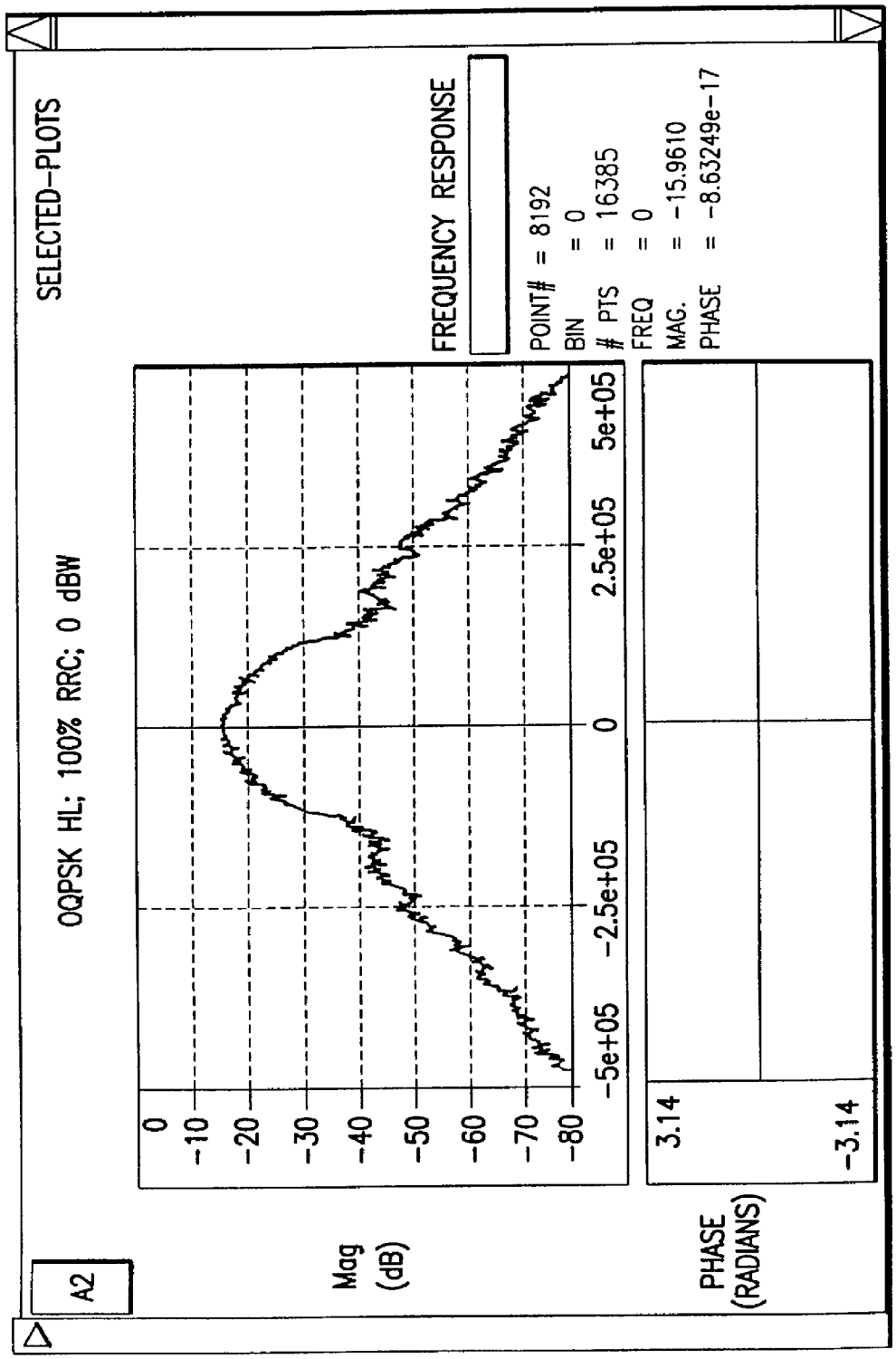
FIG.1B(3)

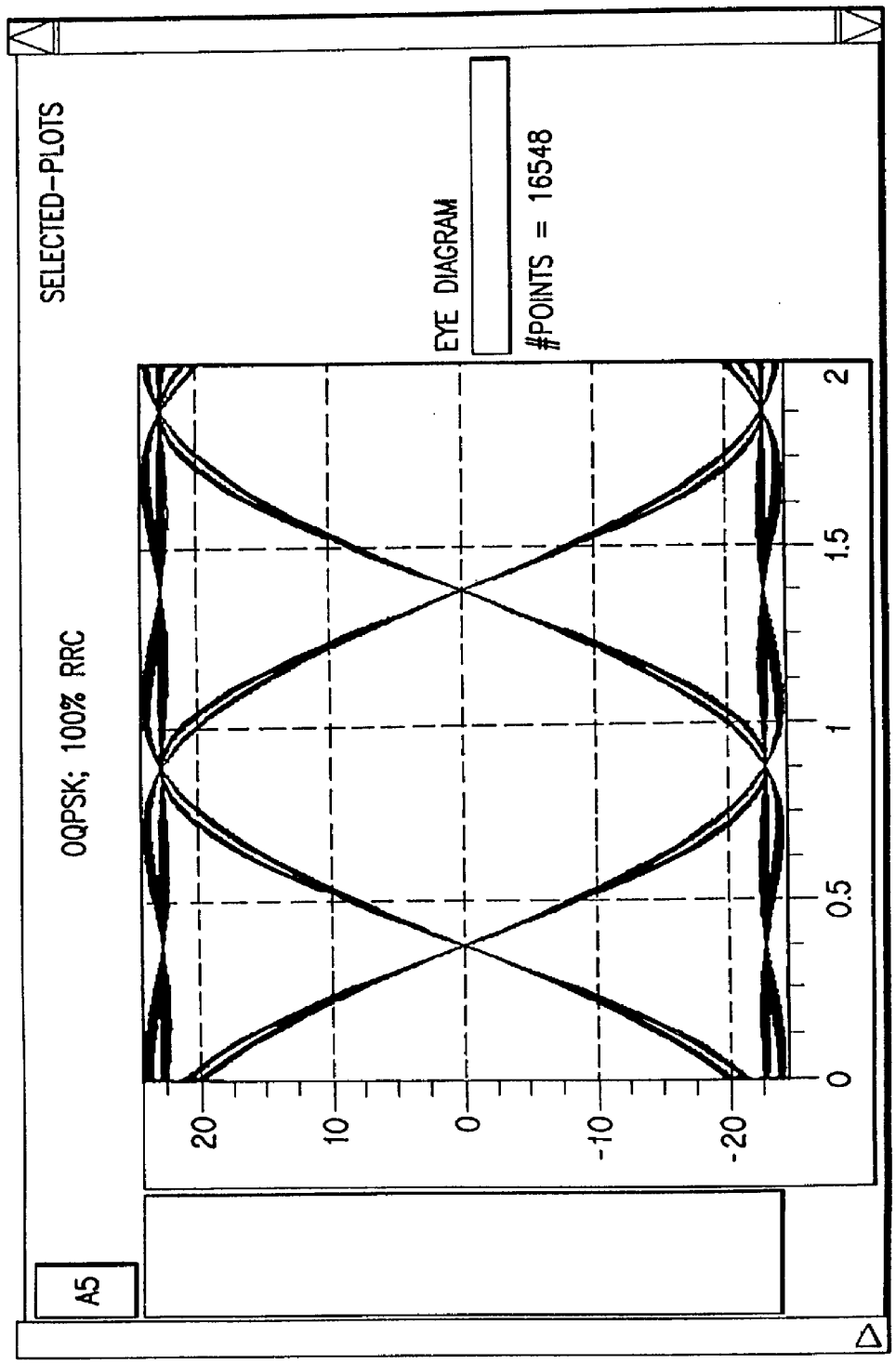
FIG.1C(1)

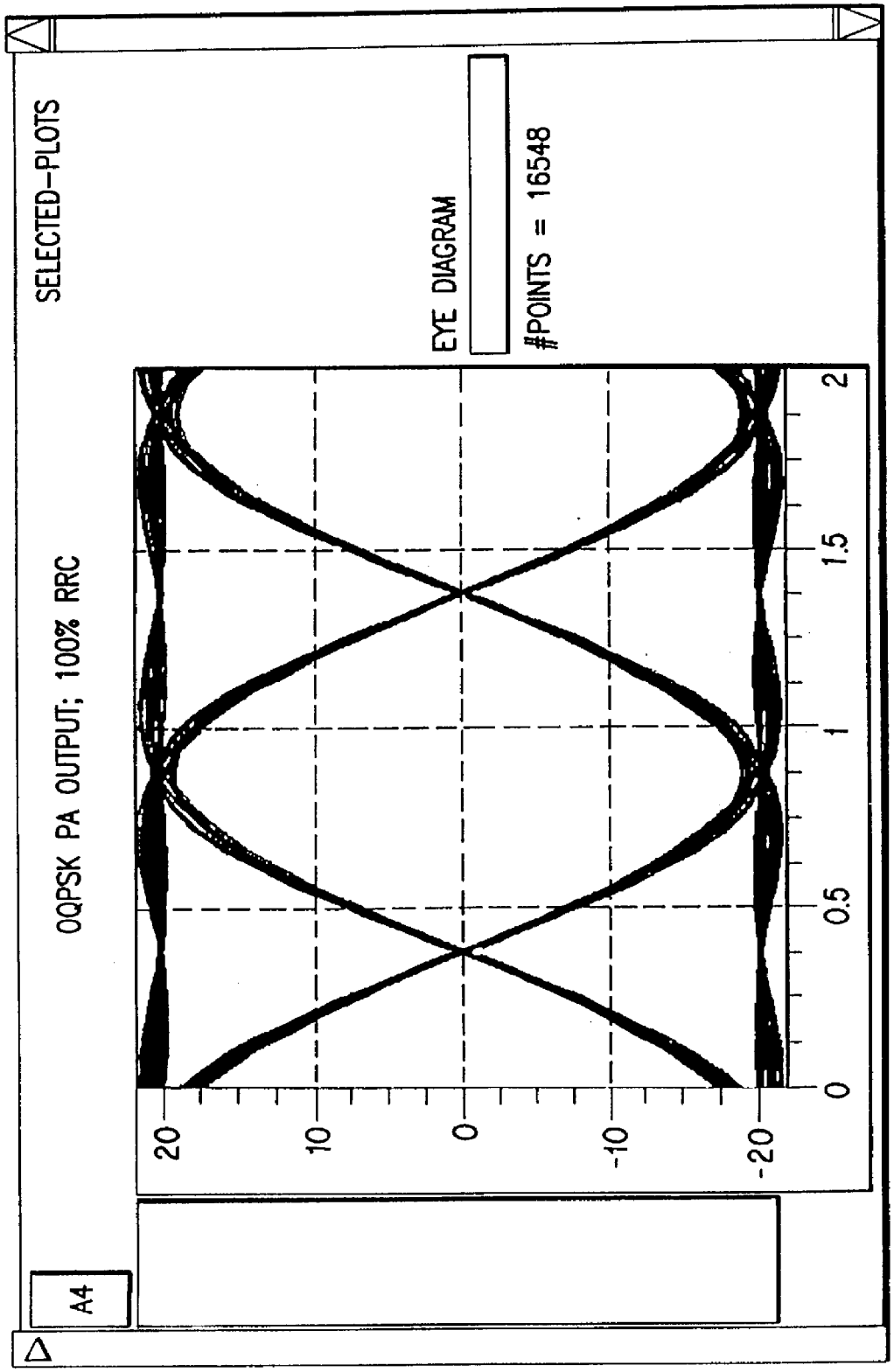
FIG.1C(2)

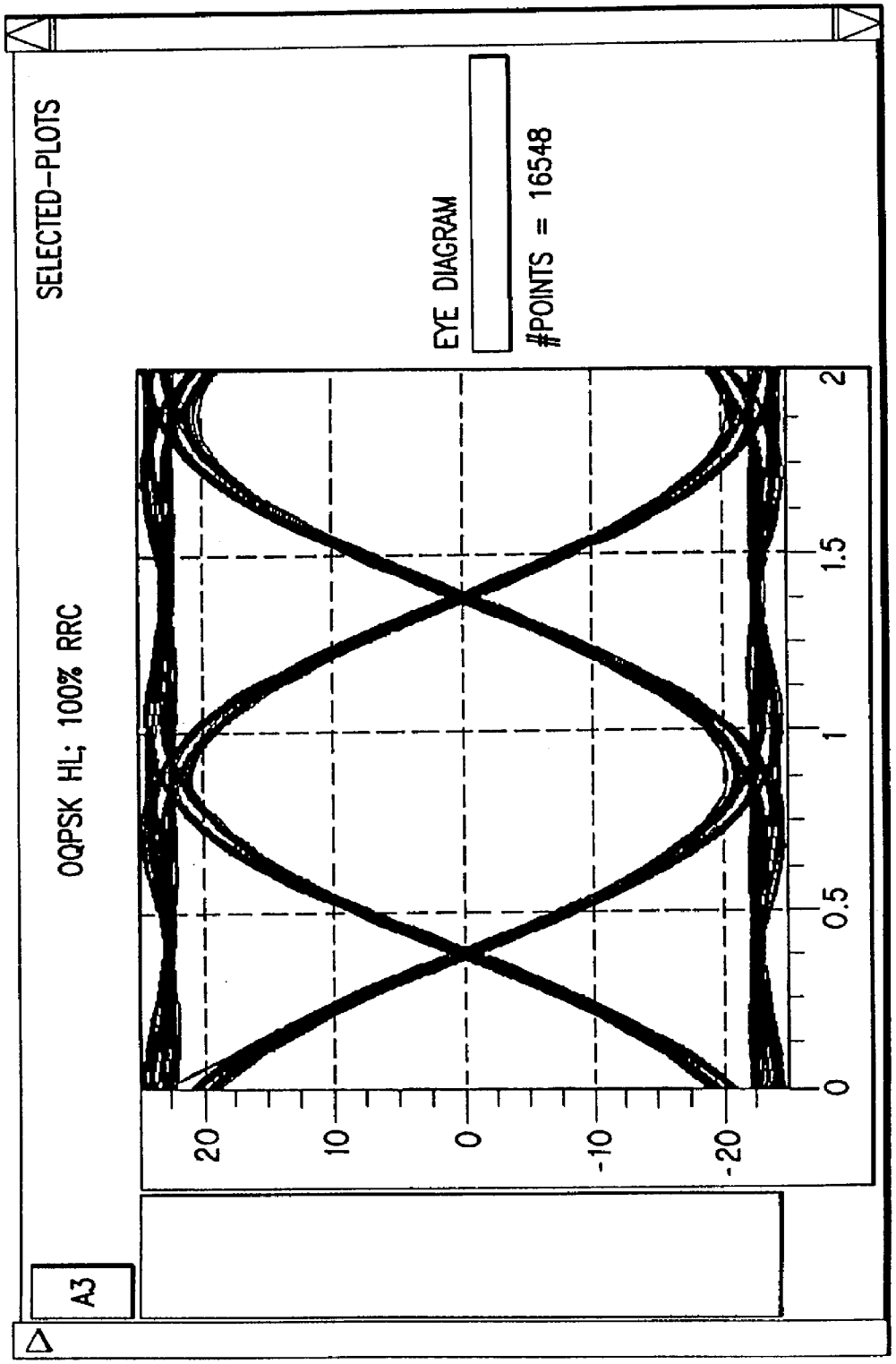
FIG.1C(3)

CONSTANT ENVELOPE CONTINUOUS PHASE FREQUENCY SHIFT KEY MODULATION APPARATUS AND METHOD AT RADIO FREQUENCIES

BACKGROUND OF THE INVENTION

1. Field of the Invention

The present invention relates to the field of generating a hard-limited angle modulated signal, for example, offset quadrature phase shift key (OQPSK) modulated signal, herein designated as Continuous Phase Frequency Shift Key (CPFSK), providing a constant envelope at radio frequencies, for example, microwave frequencies. Such a signal processor may have application in very small aperture satellite transmission (VSAT) and reception or in a ground-based microwave apparatus, and in particular in such apparatus permitting a simple frequency multiplier circuit to be used in a power amplifier circuit contained in an outdoor unit.

2. Description of Related Art

Ever since the original radio frequency experimentation conducted by Armstrong, it has become well known that a wideband frequency modulated signal (i.e., high modulation index) can be obtained from a narrowband frequency modulated signal (i.e., low modulation index) by the process of multiplication. However, the application in microwave spectra was generally not practiced. Recently, there has been interest in the concept for millimeter wave systems but no publications, patents or other disclosures have been found, thus far, in our review of the prior art.

Current very small aperture satellite terminals use an Outdoor mounted Radio frequency Unit (ORU) which is a fairly large and complicated structure, that, moreover, is quite expensive to operate and maintain. Up-conversion to microwave frequencies occurs from a low frequency, typically 70 MHz to 1450 MHz, to the microwave frequency, typically in the C, X or Ku band. This involves the use of mixers, frequency synthesizers and filters in a single or dual conversion process. Also, there is normally provided a telemetry link from a unit mounted indoors to the ORU in order to convey frequency control information to the outdoor frequency synthesizers. Also, presently, band-limited quadrature phase shift keying (QPSK) and binary phase shift keying (BPSK) modulation techniques are used which have severe envelope variations, that is, unwanted amplitude modulation, which requires use of a linear upconverter and amplifier process (i.e., output amplitude proportional to input amplitude) so the output signals are not distorted and do not cause adjacent channel interference. These modulation schemes do not provide a constant envelope output but rather involve degrees of unwanted amplitude modulation. Consequently, as used herein, the term "constant envelope" shall mean an angle or frequency modulation envelope that remains substantially constant in amplitude over time and thus contains little amplitude modulation.

A method and apparatus for providing energy dispersal over a wide bandwidth using frequency diversity in a satellite communications system is described in U.S. Pat. No. 5,454,009 (the '009 patent) of one or more of the present inventors, incorporated herein by reference. Referring briefly to FIGS. 9–12 thereof, a typical VSAT system comprises a hub station (FIG. 9) and distributes signals via satellite to a plurality of remote station terminals (FIG. 12). At the remote station, there is typically a data processing unit (DPU) and an outdoor unit (ORU) as briefly described above. The present invention comprises a new angle modulation scheme which provides for a highly economic alternative to the BPSK modulation technique used by way of example and further described by the '009 patent.

Feher and others (as represented by U.S. Pat. Nos. 4,339,724; 4,350,879; 4,567,602; 4,613,976; 4,720,839; 5,148,127 and 5,491,457; incorporated herein by reference) have worked in the field of developing a constant envelope signal but accomplished a constant envelope result by specially filtering the baseband signal. For example, Feher generally teaches the application of filtering at baseband (for example, the filter disclosed by U.S. Pat. No. 4,339,724) to provide a signal having no inter-symbol interference. Kato et al., U.S. Pat. No. 4,567,602 and Swerinson et al, U.S. Pat. No. 4,613,976 derive their approaches in significant measure on the work of Feher.

There remains a need in the art for a new modulation scheme for radio frequency applications, and microwave applications in particular, that provides a constant envelope and a controlled bandwidth output signal that obtains a similar result but by different means than the approach of Feher and others. The new modulation technique permits application of an ORU having a simple multiplier for frequency conversion and eliminates any requirement for frequency synthesis therein.

SUMMARY OF THE INVENTION

According to the present invention, a constant envelope Continuous Phase Frequency Shift Key (CPFSK) modulated signal is generated in an indoor unit for use in a transmitting system such as, for example, a very small aperture satellite (VSAT) transmitter or even a ground-based microwave or other radio transmitter. The CPFSK signal is generated by hard limiting a pulse-shaped OQPSK modulated signal, dividing the limited signal and then heterodyning the divided signal to a frequency suitable for input into the ORU containing a frequency multiplier. A VSAT terminal will be described by way of example. Hereinafter, the indoor unit may be referred to as a data processing unit (DPU), as primarily digital data applications of the present invention are contemplated. A frequency synthesizer of an indoor unit (DPU) is used to generate a fine-step radio frequency signal covering the frequency range of from, for example, 140 MHz to 148 MHz in a fine range of 25 kHz steps (for example, 40 steps per MHz or 320 steps in all). This frequency synthesized output at a selected output frequency, for example, 144 MHz, is then filtered and OQPSK modulated and is then hard-limited as will be further described below. Now, a constant envelope signal spectrum shape is defined for output to the ORU. This hard-limited or constant envelope signal approaches what may be considered 4CPFSK (coherent phase, frequency shift keying) where the 4 represents a four state input (but what really results is a three state frequency shift keying due to the offset property of the OQPSK modulated source signal). All subsequent operations (linear or non-linear) will have minimal further effect on the spectrum.

The signal is then, continuing in this example, hard-limited by a chain of limiting amplifiers, filters and a divider circuit. The hard-limited signal is divided (e.g., by eight) in order to reduce the CPFSK modulation index (e.g., by a factor of 8) to a compressed frequency range (e.g., 18+ or –0.5 MHz) and then passed to an upconverter for upconversion (e.g., to 118 MHz+ or –0.5 MHz using a 100 MHz first local oscillator). The 118 MHz output of the upconverter is bandpass-filtered to remove any trace of the local oscillator and conversion image signals. The filtered 118

MHz output is then further upconverted to 1781+ or −31 MHz using a second local oscillator output signal (preferably generated by a very low phase noise frequency synthesizer which steps in 1 MHz intervals over the range of, for example, 1632 to 1694 MHz, that is to say 1663+ or −31 MHz, so as to mechanize a selectable channel arrangement). The upconverted signal is then bandpass-filtered to remove the second local oscillator and conversion image signals. The output is a selectably stepped 4CPFSK/8 modulated signal that can be stepped in 3.125 (25/8) kHz steps. It is this 4CPFSK/8 signal that is passed to a simplified ORU comprising a times eight frequency multiplier which may be preferably comprised of a series of three stage-filtered times two multipliers, a times four and a times two frequency multiplier or other suitable combination where technology is best matched to the frequencies involved. The resulting signal is tunable over the 14 to 14.5 GHz (or Ku band) range in 25 kHz steps. Of course, for other frequencies, other bands or in other applications, a different set of division and multiplication factors, different step-wise levels for frequency synthesis, modified circuit designs and the like may be used still following the principles of the present invention. Moreover, the present invention, by outputting a hard-limited (constant envelope) OQPSK signal, permits the application of a simple frequency multiplier circuit in an ORU that greatly simplifies the construction of the ORU and moreover generates an improved hard-limited signal, over known modulation techniques, for output via the ORU.

The upconversion process utilizing a frequency multiplier results in a signal that can be easily demodulated in a conventional OQPSK demodulator with suitable matched filters. Also, besides OQPSK, the present approach may be utilized in other constant envelope continuous angle modulation schemes such as simple frequency modulation (FM) or frequency shift key (FSK), with a suitable demodulator.

Other features and advantages of the present invention will become clearer to the reader from their study of the following detailed description of the present invention which follows.

BRIEF DESCRIPTION OF DRAWINGS

The invention will be described in detail in the following description of preferred embodiments with reference to the following figures wherein:

FIGS. 1B(1) and 1C(1) depict the spectrum and corresponding eye pattern for pure band-limited linear OQPSK modulation;

FIGS. 1B(2) and 1C(2) depict the spectrum and corresponding eye pattern for band-limited linear OQPSK modulation with 1 dB of backoff in the solid state power amplifier (SSPA);

FIGS. 1B(3) and 1C(3) depict the spectrum and corresponding eye pattern for band-limited and hard-limited OQPSK modulation, CPFSK of the present invention;

DETAILED DESCRIPTION OF PREFERRED EMBODIMENTS

Figure 1:
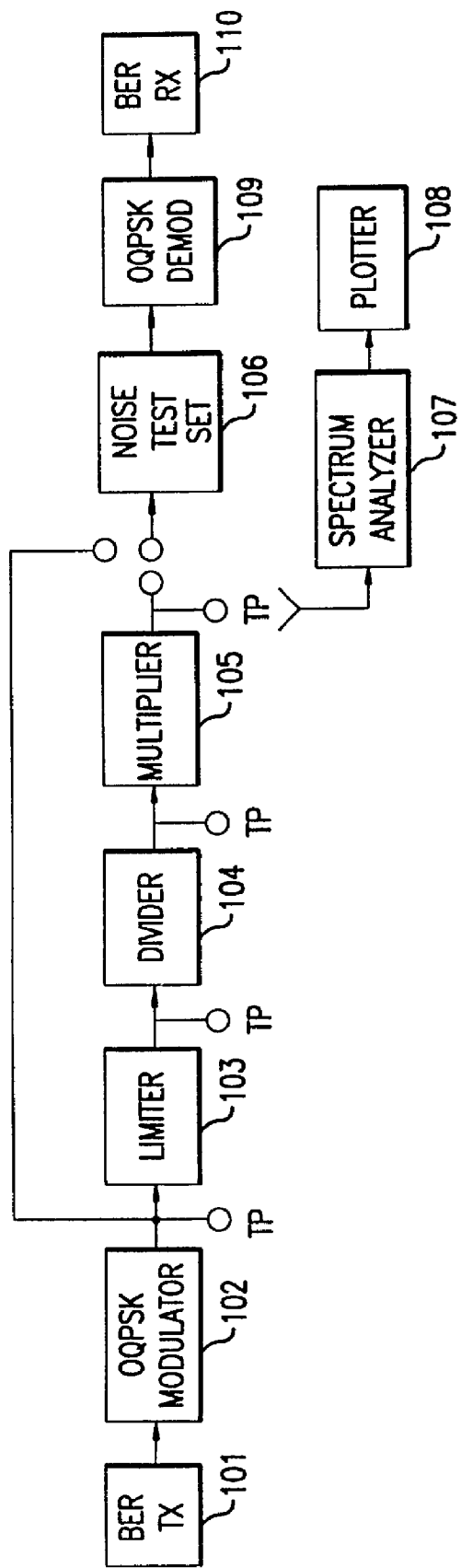
FIG. 1 is a simplified block diagram of one of a plurality of test arrangements used to demonstrate the principles of the present invention.

Referring first to FIG. 1, there is shown a test arrangement for proving the principles of the present invention. A Bit Error Rate (BER) test transmitter 101 provides a known patterned signal having known parameters to an OQPSK modulator 102. The OQPSK modulator 102 provides an output to a limiter 103, a frequency divider 104 and a multiplier 105, each having test points (TP) shown. The output of the multiplier 105 is combined with noise in a noise test set 106 to establish an Eb/No and then is provided to an OQPSK demodulator 109 and Bit Error Rate (BER) receiver 110. The output of the multiplier 105 is also provided to a spectrum analyzer 107 and plotter 108.

Besides a lab test set-up, computer simulations were used to prove the present concept. The computer simulations showed what the resulting spectrums (FIGS. 1B(1) through 1B(3)) and corresponding receiver eye-patterns (FIGS. 1C(1) through 1C(3)) look like through each process. Starting with 40% Root Raised Cosine (RRC) filtering of the information data signal to be transmitted, it was discovered that there was too much amplitude modulation on the signal envelope of a signal output from an OQPSK modulator, which then resulted in a poor spectrum after hard-limiting. Other filters may be applied to advantage besides an RRC filter. Also, the long memory in the heavily controlled Inter-Symbol-Interference (ISI) waveform caused severe eye-pattern distortion after the non-linear processing (e.g., hard-limiting).

A 70–100% RRC filtering range demonstrated that the trade-off between main lobe bandwidth, rate of roll-off of sidelobe tails and maximum eye-pattern opening could be optimized. The results of these simulations were verified via the experimental arrangement of FIG. 1 and variations thereof as described below.

FIGS. 1B(1) and 1C(1) depict the spectrum and corresponding eye pattern for pure band-limited linear OQPSK modulation. FIGS. 1B(2) and 1C(2) depict the spectrum and corresponding eye pattern for band-limited linear OQPSK modulation with 1 dB of backoff in the solid state power amplifier (SSPA). FIGS. 1B(3) and 1C(3) depict the spectrum and corresponding eye pattern for band-limited and hard-limited OQPSK modulation, CPFSK of the present invention. It can be seen that the side lobe spectrum of the hard-limited OQPSK (FIG. 1B(3)) is similar to, but somewhat degraded to, that of the typical transmitted OQPSK with 1 dB of backoff in the SSPA (FIG. 1B(2)), and the eye patterns of the two are relatively similar. The hard-limiting OQPSK (CPFSK) will require a somewhat wider (25 to 30%) channel assignment than that of the typically transmitted OQPSK. The occupied bandwidth of the CPFSK is about half way between that of band-limited OQPSK and BPSK.

Figure 1A:
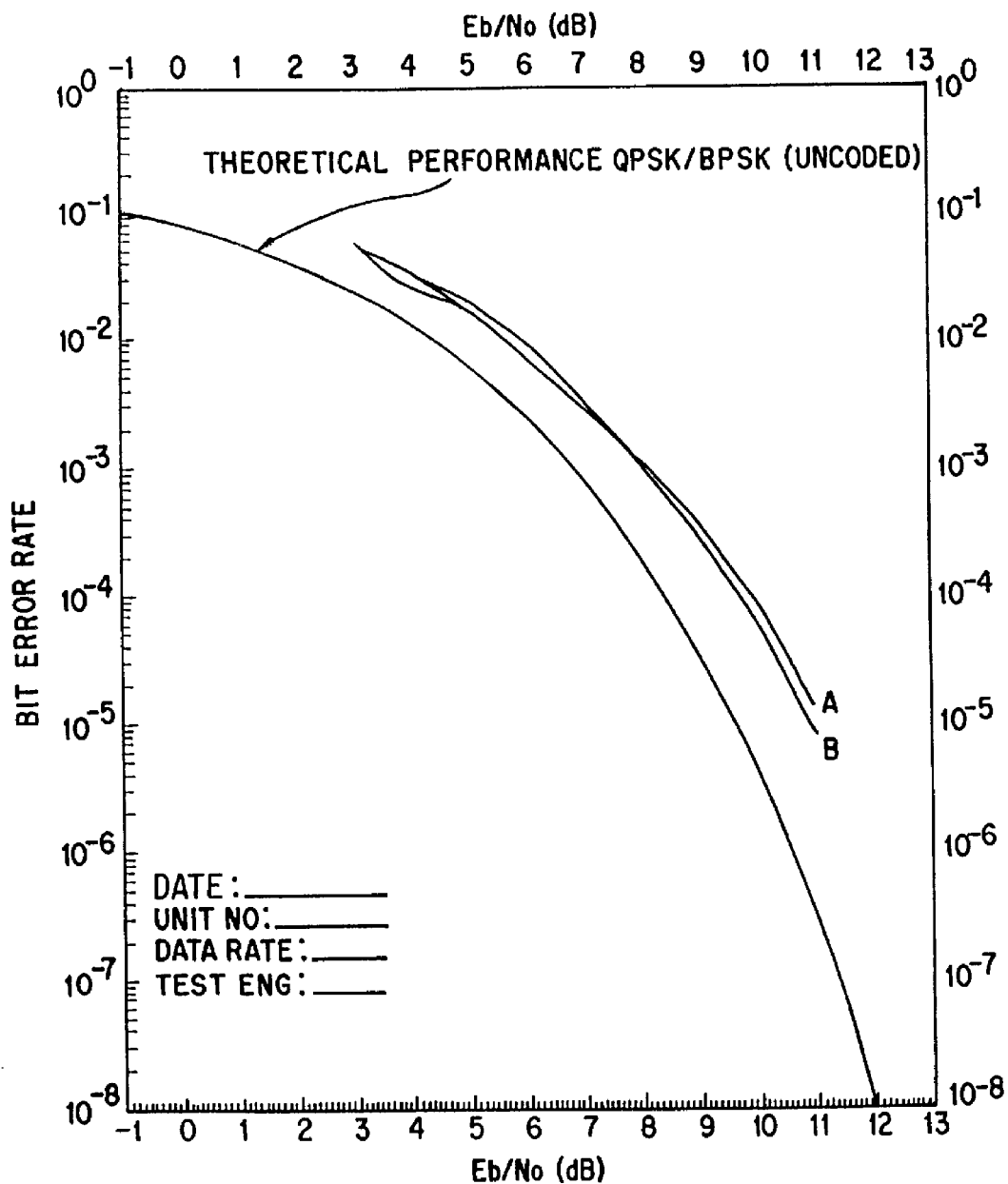
FIG. 1A is a graphical plot of bit error rate (BER) versus Eb/No (dB) where Eb represents energy per bit and No is the noise energy in one hertz bandwidth showing a theoretical performance for QPSK/BPSK (uncoded) and curves for a hard-limited OQPSK (or CPFSK) signal according to the present invention and for another OQPSK signal which describes some of the experimental results obtained using simulation and experimental lab arrangements.

Modulator 102 and demodulator 109 were connected back-to-back via the noise test set 106 and base-line bit error rate measured versus Eb/No (bit energy level versus noise energy in a one Hertz bandwidth). Then the modulator was connected to the limiter/divider/multiplier chain shown in FIG. 1 and the same measurements taken. The results show that there was only a slight degradation due to the hard-limiting process provided via the limiter. This can be seen from FIG. 1A which shows several graphs of bit error rate (BER) versus Eb/No (dB). A theoretical performance of QPSK/BPSK (uncoded) is shown which approximates curves A and B. Curve A represents hard-limited OQPSK according to the present invention while curve B represents OQPSK (not hard-limited), both with differential coding. It can be seen that there is no practical difference between curves A and B while hard-limited OQPSK will provide the advantages and features sought by the present invention.

Further experimentation was performed to compare hard-limited OQPSK with existing formats, for example, BPSK/QPSK. It was found that the channel bandwidth occupancy of the hard-limited OQPSK signal for a given data rate is essentially the same as that for the current or known techniques. But more importantly, the hard-limited OQPSK signal can operate at full ORU power since the amount of backoff has no effect on the spectrum (because, for one reason, it has been predetermined by the initial hard limiting.) One of the important benefits of the constant-envelope, hard-limited OQPSK (CPFSK) signal format is that it will enable the use of a low-cost, non-linear multiplier in the outdoor unit (ORU) and thus permit the use of a more efficient saturated power amplifier in the outdoor unit (ORU).

Figure 3:
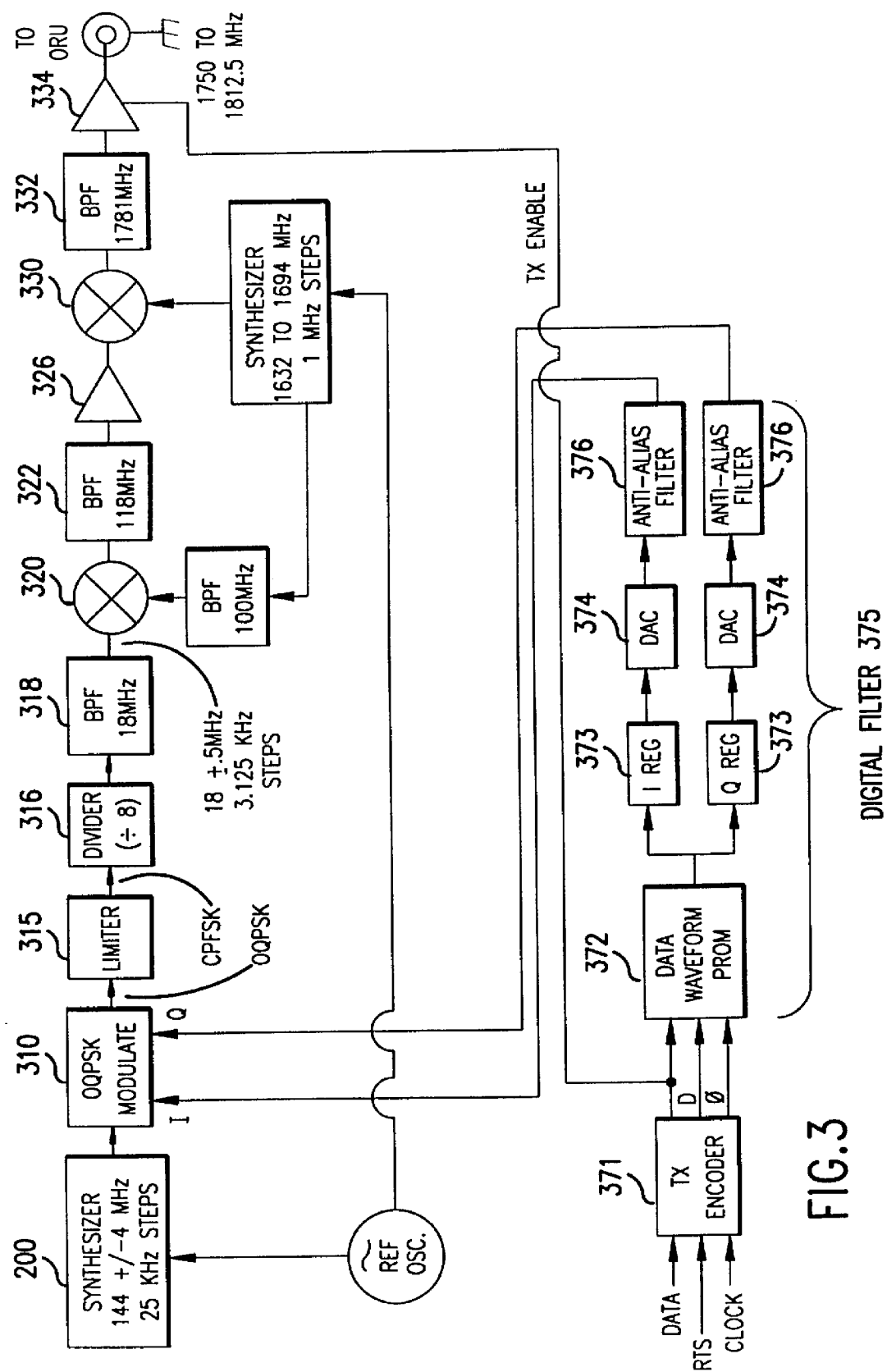
FIG. 3 is a block diagram of one embodiment of a data processing unit (DPU) of a remote station comprising a constant envelope modulator according to the principles of the present invention adapted for application with a very small aperture satellite transmitter. The principles described thereby may find application in microwave and other non-microwave (pure FM) transmitters requiring constant envelope output.
Figure 4:
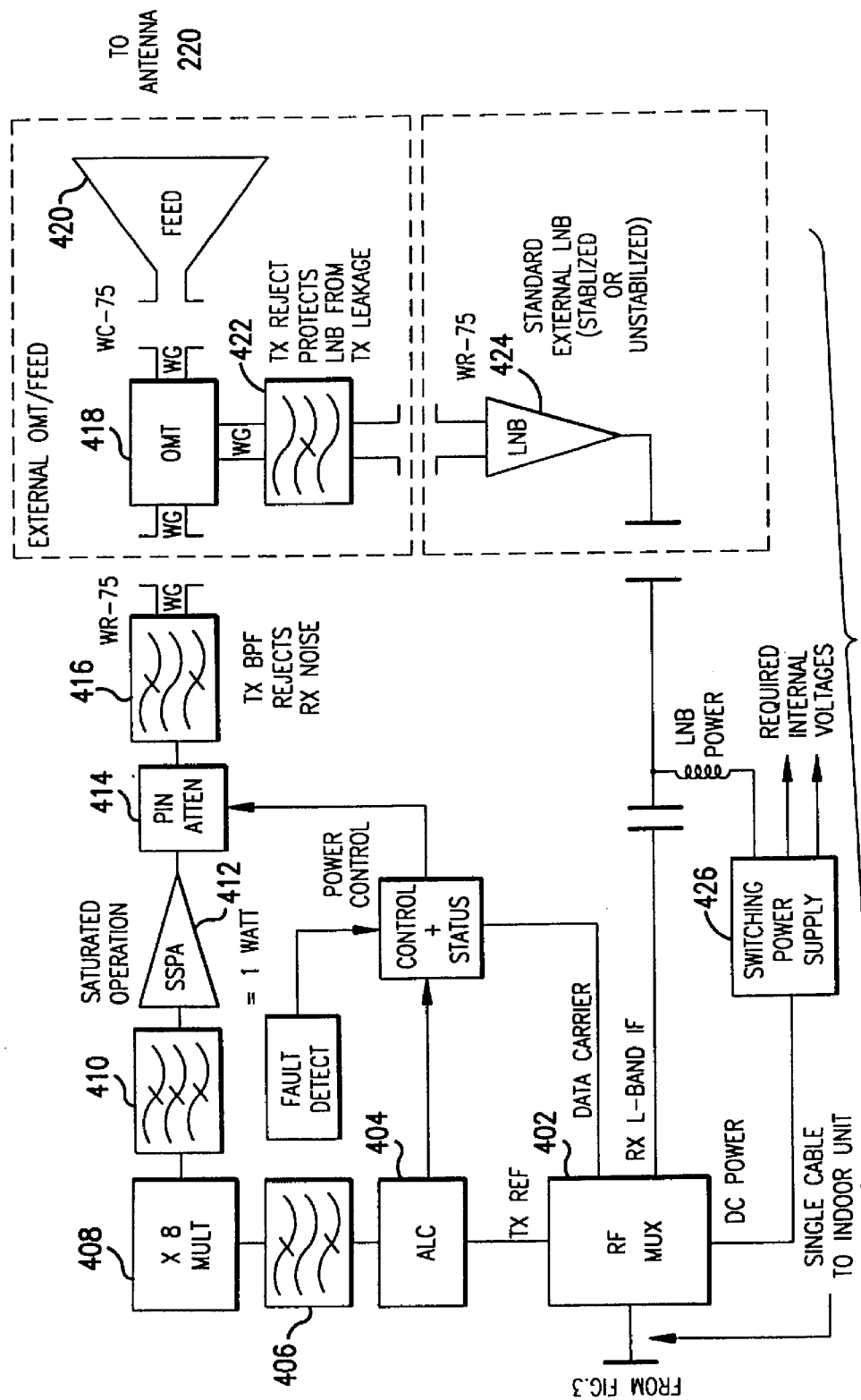
FIG. 4 is a schematic block diagram of a highly efficient outdoor radio frequency unit (ORU) suitable for application with the modulator (DPU) of FIG. 3 including a simple multiplier circuit for frequency conversion, FIG. 3 and 4 together comprising an embodiment of a constant envelope OQPSK/CPFSK modulator and upconvertor at microwave frequency output for use, for example, as a VSAT signal remote station transmitter. The DPU embodiment of FIG. 3 permits the application of a simple frequency multiplier arrangement in an outdoor unit as shown by way of example in FIG. 4 for providing output microwave signals.

This test arrangement and simulation were used to demonstrate the principles of the present invention, a constant envelope OQPSK modulator according to the present invention, of which FIG. 3 is an example, is adapted to be utilized with the outdoor radio frequency unit that includes a simple frequency multiplier for frequency conversion of FIG. 4.

Figure 2:
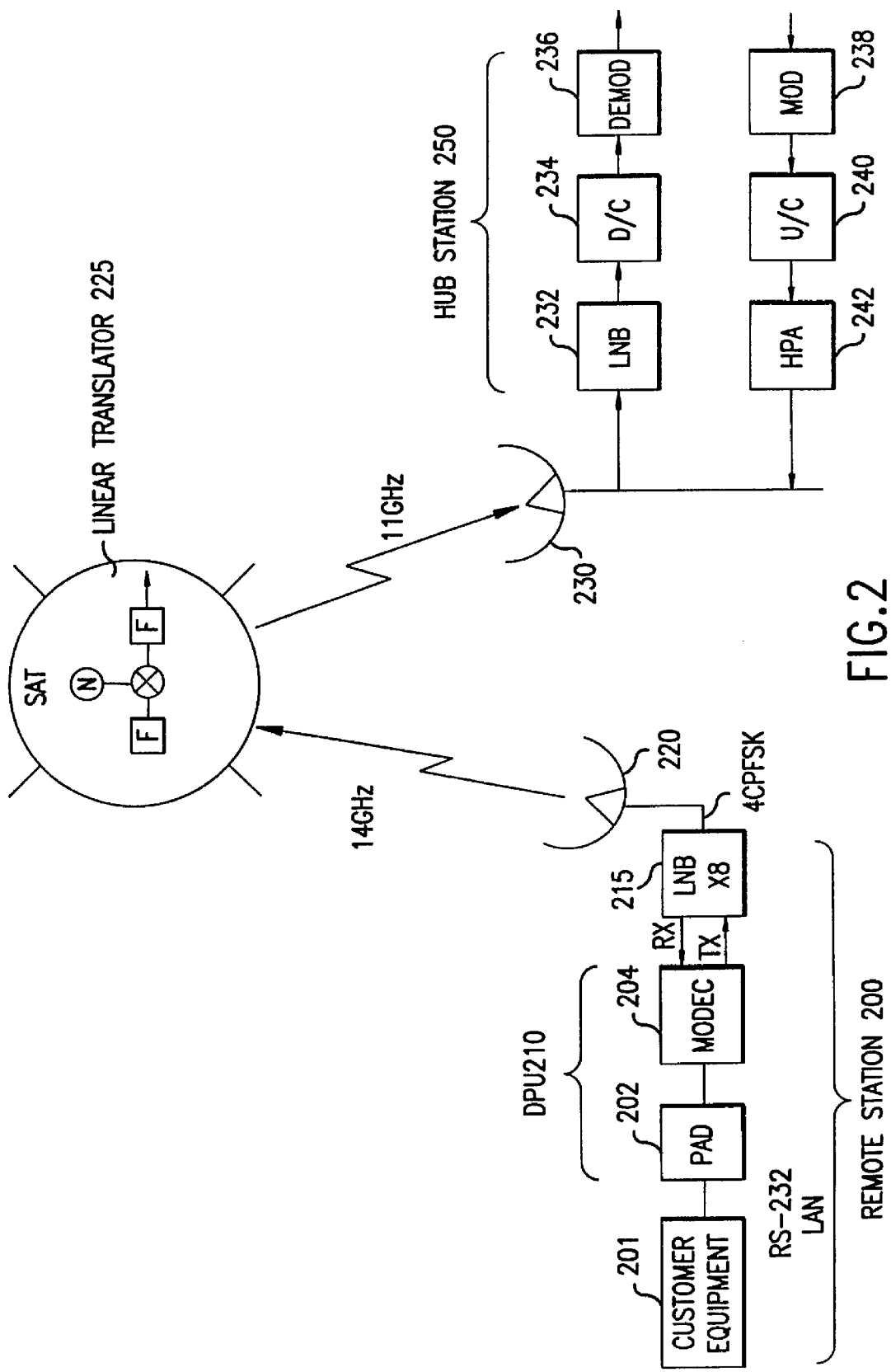
FIG. 2 is a system block diagram of a typical VSAT transmitter and receiver system arrangement which constitutes one application of the present invention showing at left a remote station according to the present invention and at right a hub station, the hub station typically communicating with a plurality of remote stations via a satellite transceiver shown.

Referring now briefly to FIG. 2, a system block diagram of a system application of the present invention is demonstrated by way of the depicted exemplary implementation in a very small aperture satellite terminal (VSAT) communication system comprising a plurality of remote stations typified by the remote station terminal 200 depicted at the left of the drawing and a hub station 250 depicted at the right of the drawing. These communicate via one or more satellite transceivers which act as repeaters and repeat a received signal received via an uplink at a different downlink frequency toward the intended receive station. Such systems permit two way communication and transmit and receive primarily at designated microwave frequencies regulated by the United States Federal Communications Commission or internationally through international regulatory agencies. Of course, other embodiments of the present invention, for example, in long distance microwave landline applications or at other than microwave frequencies such as UHF and other high frequency radio applications, are possible. Modifications to the discussed embodiment and application of the present invention should come to mind from the following detailed description.

The remote station 200 may comprise customer equipment 201 which generally provides for generation and reception of a plurality of digital data signals communicated through the satellite transceiver 225 with hub station 250. For example, an RS232 interface may be provided between such equipment and a data processing unit 210 of the VSAT remote station terminal. The DPU 210 comprises a data Packet Assembler/Disassembler (PAD) 202 and a modulator/encoder/demodulator/decoder or MODEC 204 for transmitting and receiving data messages. The DPU has a two-way communications link with an outdoor radio frequency unit (ORU) 215 which, referring briefly to FIG. 4, comprises a multiplier 408 according to the present invention, a low noise block converter (LNB) 424 and a SSPA 412 for communicating with an antenna 220, typically a one meter dish. Further details of the circuitry of the present invention will be discussed in connection with the following discussion of FIGS. 3 and 4.

The output (transmission side) of the remote station 200 according to the present invention is a hard-limited, constant envelope angle modulated signal, preferably a hard-limited offset quadrature phase shift keyed (OQPSK) signal which may also be referred to as a 4 coherent or continuous phase frequency shift key (4CPFSK) signal. The output, for example, at 14 gHz is repeated by satellite transceiver 225 at 11 gHz to hub station 250.

Hub station 250 comprises an antenna 230. Coupled to antenna 230 are an LNB 232 of a receive path, a down converter (D/C) 234 and a demodulator (DEM) 236 for receiving signals from remote station 200, the demodulated signals being further utilized by an intended user. In the transmit path, typically, there is provided a modulator (MOD) 238 which modulates data to be transmitted onto a carrier, an up-converter (U/C) 240 for upconverting to a higher radio frequency and a high power amplifier (HPA) 242 for powering the modulated, up-converted signal to antenna 230.

DPU 210 is further described herein as employing a constant envelope, hard-limited angle modulation scheme to generate a signal that may be simply frequency multiplied in an ORU 215 using a simple staged-filtered frequency multiplier circuit.

Referring now to FIG. 3, a data processing unit (DPU) according to the present invention, there is provided (e.g., in the VSAT terminal example of one application of the present invention a) selectable step frequency synthesizer 200. The frequency synthesizer, for example, may generate a fine-step radio frequency signal covering the frequency range of from, for example 140 MHz to 148 MHz in a fine range of 25 kHz steps. The frequency synthesized output at a selected frequency, for example, 144 MHz, is then OQPSK modulated and then hard-limited.

A plurality of narrowband voice/data channels or compressed television or data signals are combined according to well known techniques by a time division or statistical multiplexer known in the art. The output of the multiplexer, after being suitably band limited by digital filter 375, may be provided in in-phase (I) and quadrature-phase (Q) at mixer 310.

The output of the mixer is then hard-limited and filtered via hard limiting circuitry 315. In a typical implementation, hard limiting circuitry 315 is either a hard-limiting amplifier driven into saturation or an emitter coupled logic circuit. Thus, circuitry 315 converts an essentially analog signal at its input to a limited signal at its output of a binary (e.g., digital) character. This removes any amplitude modulation that may exist on the signal output of OQPSK modulator 310.

The hard-limited signal, in this example, is divided by eight at divide by eight circuit 316. After the divide by eight circuit 316, the signal is preferably band-pass filtered at filter 318 operative at 18MHz+ or −0.5 MHz. Divider circuit 316 may be implemented in a digital logic counter (i.e., divider). For example, limiter 315 may include an emitter coupled logic gate and divider 316 may include a compatible emitter coupled logic digital counter of a suitable modulus, in this case, of modulus 8. The last stage of the digital counter will toggle at a frequency of only one-eighth of the frequency of the input to the counter. The last stage signal from the counter is then filtered in band-pass filter 318 to mixer 320 (or more particularly, the upconverter comprising mixer 320, filter 322, amplifier 326, mixer 330, filter 332 and amplifier 334). Band-pass filter 318 filters a basically binary last stage (of counter) signal to generate a basically analog signal into mixer 320.

At mixer 320, the signal is up-converted to 118 MHz+ or −0.5 MHz using a 100 MHz first local oscillator shown. The 118 MHz output of mixer 320 is band-pass filtered through SAW (surface acoustic wave) filter 322, amplified in amplifier 326 to remove any trace of the local oscillator and conversion image signals.

The filtered 118 MHz output is then further up-converted at mixer 330 to 1781+ or −31 MHz using a second local oscillator output signal (preferably generated by a very low phase noise frequency synthesizer 370 which steps in 1 MHz intervals over the range of, for example, 1632 to 1694 MHz, that is to say 1663+ or −31 MHz). The output of the mixer 330 is provided to bandpass filter 332 and then to amplifier 334 to remove the second local oscillator and conversion image signals. The output is a selectably stepped 4CPFSK/8 modulated signal that can be stepped in 3.125 (25/8) kHz increments. It is this 4CPFSK/8 signal that is passed to a greatly simplified ORU (in comparison with prior art VSAT terminals) comprising a times eight multiplier as will be further described in connection with the following discussion of FIG. 4.

Referring again to FIG. 3, there is shown specific detail directed to the control and data stream generation for the data processing unit. Transmit encoder 371 receives a plurality of input digital channels including: (1) data coming from a packet assembler/disassembler PAD, (2) a clock signal, and (3) a request to send RTS signal. The TX encoder 371 provides scrambling, forward error correction (FEC) encoding, and data formatting. The TX ENABLE signal provides the means by which the DPU/ORU may be operated to transmit burst packets of data.

Digital filter 375 is provided at the output of encoder 371 for filtering the output signal. Digital filter 375 includes data waveform PROM 372, registers 373, digital to analog converters 374, and low pass filter 376. According to the experimental results described above, digital filter 375 preferably has a 70–100% rolloff characteristic. The output of encoder 371 is a data stream, phase information and a transmit control lead (TX ENABLE). The latter signals to data waveform PROM 372 and turns on and off the final output to the transmitter as shown by removing power from amplifier 334. In-phase (I) and quadrature-phase (Q) data outputs are provided by digital filter 375 to mixer 310.

Figure 4A:
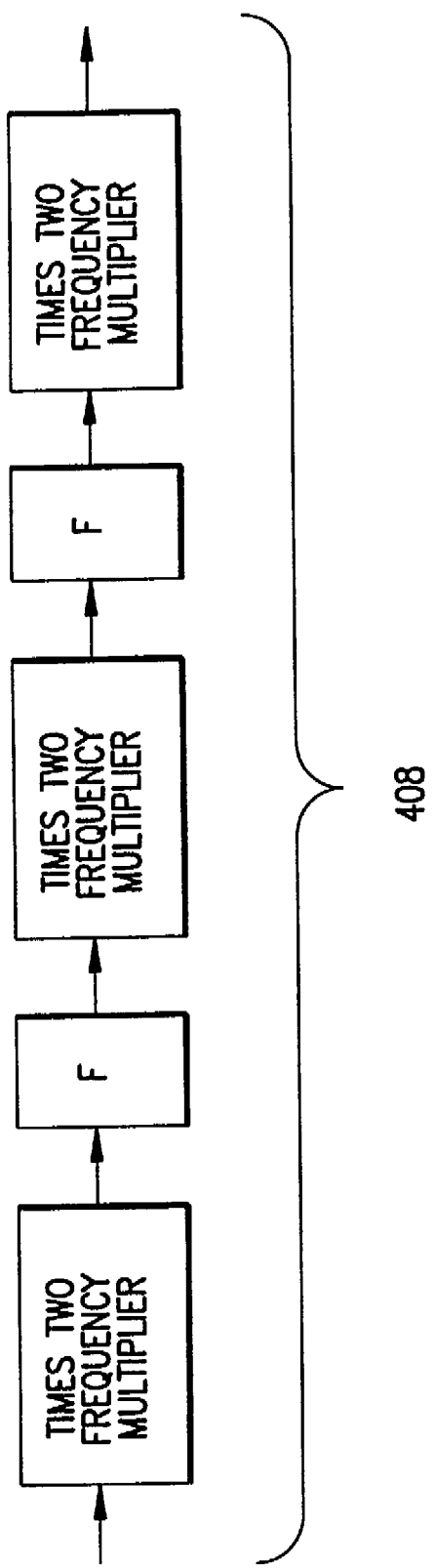
FIG. 4A is an example of one embodiment of a multiplier circuit of the ORU of FIG. 4 showing a series string of times 2 multipliers separated by filters.

Referring to FIG. 4, there is shown a simplified outdoor radio frequency unit for use with the data processing unit of FIG. 3. The generated signal from the DPU is provided to RF multiplexer 402 and follows the path 404–416 to reach Orthogonal Mode Transducer (OMT) 418 which provides for polarization isolation (i.e., separation) between transmitter and receiver. This path includes bandpass filter 406, times eight frequency multiplier 408 and band-pass filter 410. In the preferred embodiment shown in FIG. 4A for frequency multiplier 408, the transmit path preferably comprises a series of, for example, three times two frequency multiplier circuits which may be individually separated by band-pass filters F. Of course, if frequencies utilized in a particular design vary from those chosen in the present embodiment, a times three or times four frequency multiplier circuit may replace one or more times two frequency multiplier circuits or other frequency multiplication circuits may be used. Moreover, regarding the described system as a whole, only one or even three stages of upconversion/downconversion may be utilized to reach a desired output frequency. According to the depicted embodiment, the hard-limited OQPSK (CPFSK) signal may be easily demodulated at a signal receiver in an OQPSK demodulator having a pair of suitably matched filters.

The receive path (FIG. 4) comprises a receive band separation filter 422 and LNB 424. A power supply 426 provides required internal voltages for the ORU of FIG. 4. Note that there is no frequency synthesis required in the ORU and minimum status and control features are required. There is a single simple cable to the indoor unit having no frequency synthesis control as in prior art outdoor units. It is in this way that the DPU (data processing unit) produces a reduced modulation index signal (relative to the modulation index of the OQPSK modulated signal) that may be frequency multiplied, in a simple outdoor unit, ORU, to generate a modulated microwave frequency signal with the same modulation index as in the originally OQPSK modulated signal since the frequency multiplication restores the modulation index reduced by the divider circuitry. The need for complex outdoor circuits is eliminated.

Thus, there has been shown and described one embodiment of a system embodying the advantageous constant envelope angle modulation process and apparatus of the present invention permitting a greatly simplified outdoor unit when utilized in a microwave radio application. The outdoor unit may be located in areas that are less environmentally secure than the indoor unit. Old art devices that rely on outdoor units housing frequency synthesizers or phase-locked loops are more susceptible to environmental factors such as temperature and moisture than the frequency multiplier embodied in the present invention. As a result, the present invention obviates a need for expensive environmental controls (e.g., heated crystal oscillators) that may be required by the old art. The present invention, thus, provides a low cost, rugged and reliable modulating system.

Any article or patent referred to herein should be deemed to be incorporated by reference as to any subject matter deemed relevant to an understanding of the present invention. The present invention should only be considered limited in scope by the claims to the invention which follow.

Having described preferred embodiments of a novel constant envelope modulation process and method (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by letters patent is set forth in the appended claims.

What is claimed is:

1. An apparatus for generating a hard-limited, constant envelope angle modulated signal comprising:
   a modulator for OQPSK modulating an input information signal; and
   a hard-limiting circuit for hard-limiting, and output of the modulator, said hard-limiting circuit comprising a series connection of a hard-limiting amplifier, a filter circuit and a divider circuit.

2. The apparatus of claim 1, wherein:
   the modulater and hard-limiting circuit are contained within a housing for an indoor application; and
   the apparatus further comprises an outdoor housing, the outdoor housing including an input and a multiplier circuit for frequency multiplication of a signal at the input.

3. The apparatus of claim 2, wherein said outdoor housing houses no frequency synthesizer.

4. The apparatus of claim 1, further comprising an upconverter coupled to the hard-limiting circuit and a multiplier circuit coupled to said upconverter, the upconverter being for frequency translating an output of the hard-limiting circuit, the multiplier circuit being for frequency conversion of an output of the upconverter to microwave frequencies.

5. The apparatus of claim 2, wherein said multiplier circuit comprises at least one multiplier to convert an input signal to a particular microwave frequency output signal.

6. The apparatus of claim 5, wherein each multiplier includes a non-linear element coupled to a band-pass filter circuit.

7. The apparatus of claim 5, wherein said at least one multiplier includes first and second non-linear elements, a band-pass filter circuit being electrically coupled between said first non-linear element and said second non-linear element.

8. The apparatus of claim 1, further comprising a data encoder including a filter circuit having a roll-off characteristic of approximately 70–100% for outputting an encoded data stream to said modulator.

9. The apparatus of claim 8, wherein said filter circuit comprises a root raised cosine filter.

10. The apparatus of claim 8, further comprising a circuit coupled to the output of said data encoder for outputting in-phase and quadrature phase data streams for input to said modulator.

11. The apparatus of claim 10, wherein said output of said hard-limiting circuit is a constant envelope, hard-limited offset quadrature phase key modulated signal.

12. The apparatus of claim 2, wherein said outdoor housing houses no phase-locked loop.

13. In a very small aperture terminal for satellite communication having an indoor unit and an outdoor unit, the outdoor unit housing:
   a multiplier circuit for receiving a hard-limited constant envelope angle modulated signal of reduced modulation index outputted from the indoor unit and for converting said signal to microwave frequencies for transmission, said unit containing no frequency synthesizer circuit for microwave frequency translation.

14. The outdoor unit of claim 13, wherein said angle modulated signal of reduced modulation index comprises a constant envelope offset quadrature phase shift key modulated signal.

15. A modulating system to provide a reduced modulation index signal comprising:
   a modulator to produce a first signal characterized by a first modulation index;
   a divider coupled to the modulator to produce a second signal characterized by a second modulation index, the second modulation index being less than the first modulation index;
   an upconverter coupled to the divider to frequency translate the second signal to produce the reduced modulation indexing signal; and
   a limiter coupled between the modulator and the divider to provide a constant envelope signal to the divider.

16. The system of claim 15, wherein the limiter includes one of an emitter coupled logic gate and a hard-limiting amplifier driven to saturation.

17. The system of claim 15, wherein:
   the limiter includes one of an emitter coupled logic gate and a hard-limiting amplifier driven to saturation; and
   the divider includes a digital logic divider circuit.

18. The system of claim 15, further comprising a multiplier circuit to generate an output signal from the reduced modulation index signal, the output signal being characterized by an output modulation index substantially equal to the first modulation index.

19. The system of claim 16, wherein the divider includes a digital logic divider circuit.

20. The system of claim 15, further comprising a multiplier circuit to generate an output signal from the reduced modulation index signal, the output signal being characterized by an output modulation index substantially equal to the first modulation index.

21. The system of claim 20, wherein:
   the modulator, the divider and the upconverter are housed in a first housing; and
   the multiplier circuit is housed in a second housing remotely located from the first housing.

22. The system of claim 21, wherein;
   the first housing is located in a first location; and
   the second housing is located in a second location that is less environmentally secure than the first location.

23. The system of claim 15, wherein the modulator includes:
   an offset quadrature phase shift key modulator; and
   a pre-filter to filter an information signal, the filtered information signal being coupled to the offset quadrature phase shift key modulator.

24. A method of modulating an information signal for transmission at microwave frequencies comprising steps of:
   modulating a radio frequency with a filtered data information signal to generate a first signal, the first signal being an offset quadrature phase shift key modulated signal characterized by a first modulation index;
   hard-limiting the first signal;
   dividing said hard-limited signal to generate a second signal, the second signal being characterized by a second modulation index;

upconverting said divided signal to generate a reduced modulation index signal at a first frequency; and multiplying said reduced modulation index signal to generate an output signal at a second frequency, the output signal being characterized by an output modulation index substantially equal to the first modulation index.

25. The modulating method of claim 24, further comprising a preliminary step of filtering an input information signal in a filter with a characteristic roll-off of approximately 70–100% to generate the filtered data information signal.

26. The modulating method of claim 25, wherein said filtering is applied via a root raised cosine filter.

27. The modulating method of claim 24, further comprising a preliminary step of band-limiting an input information signal to generate the filtered data information signal.

28. The modulating method of claim 24, wherein a ratio of the second frequency divided by the first frequency equals a ratio of the first modulation index divided by the second modulation index.

* * * * *